United States Patent
Hayashi et al.

(10) Patent No.: US 8,254,219 B2
(45) Date of Patent: Aug. 28, 2012

(54) OBJECTIVE LENS ACTUATOR AND OPTICAL PICKUP DEVICE HAVING THE SAME

(75) Inventors: Sotaro Hayashi, Osaka (JP); Ryozo Hosoda, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 806 days.

(21) Appl. No.: 12/010,213

(22) Filed: Jan. 22, 2008

(65) Prior Publication Data
US 2008/0181087 A1 Jul. 31, 2008

(30) Foreign Application Priority Data

Jan. 22, 2007 (JP) .................................. 2007-010983

(51) Int. Cl.
*G11B 7/00* (2006.01)
(52) U.S. Cl. ..................................................... 369/44.14
(58) Field of Classification Search .................. None
See application file for complete search history.

(56) References Cited

U.S. PATENT DOCUMENTS

| 5,453,962 A * | 9/1995 | Fujita et al. ................. 369/44.23 |
| 6,195,314 B1 * | 2/2001 | Inui et al. .................... 369/44.14 |
| 2004/0264352 A1 | 12/2004 | Ohya ........................ 369/112.23 |
| 2005/0007906 A1 | 1/2005 | Horinouchi et al. ........ 369/44.37 |
| 2005/0201221 A1 * | 9/2005 | Maeda et al. ............... 369/44.23 |
| 2006/0007799 A1 * | 1/2006 | Yoshinaga et al. ......... 369/44.14 |
| 2006/0018214 A1 | 1/2006 | Fujii et al. .................. 369/44.37 |
| 2006/0028935 A1 * | 2/2006 | Mori et al. .................. 369/44.37 |
| 2006/0203627 A1 * | 9/2006 | Osaka ........................ 369/44.16 |

FOREIGN PATENT DOCUMENTS

| EP | 1 612 778 A2 | 1/2006 |
| JP | 5-101429 A | 4/1993 |
| JP | 10-11765 A | 1/1998 |
| JP | 2001-160229 A | 6/2001 |
| JP | 2005-174485 | 6/2005 |
| JP | 2006-338811 A | 12/2006 |

* cited by examiner

*Primary Examiner* — Hoa T Nguyen
*Assistant Examiner* — Emily Frank
(74) *Attorney, Agent, or Firm* — Morgan, Lewis & Bockius LLP

(57) ABSTRACT

An objective lens actuator includes a plurality of objective lenses, a first lens holder on which the plurality of objective lenses are mounted, and a drive mechanism that drives the first lens holder. At least one of the plurality of objective lenses is mounted on the first lens holder while being held by the second lens holder. Formed on the second lens holder are a slide part which slides the second lens holder with respect to the first lens holder at a time of assembly, and a projection arranged outward of the slide part and protruding toward the first lens holder with the second lens holder being mounted on the first lens holder. The lens holder has a groove formed therein where the projection is securely adhered.

16 Claims, 4 Drawing Sheets

OBJECTIVE LENS ACTUATOR AND OPTICAL PICKUP DEVICE HAVING THE SAME

This application is based on Japanese Patent Application No. 2007-10983, filed on Jan. 22, 2007, and the contents of which are hereby incorporated by reference.

BACKGROUND OF THE INVENTION

1. Field of the Invention

The present invention relates to an objective lens actuator to be equipped in an optical pickup device which irradiates a light beam to an optical recording medium to enable recording and reading information, and, more particularly, to the configuration of an objective lens actuator having a plurality of objective lenses. The present invention also relates an optical pickup device having such an objective lens actuator.

2. Description of the Related Art

Optical recording mediums, such as a compact disc (hereinafter called "CD") and digital versatile disc (hereinafter called "DVD"), are popular. Further, studies have recently been made on enhancement of the density of optical recording mediums to increase the amount of information thereof, thereby putting optical recording mediums, such as HD-DVD and Blu-ray Disc (hereinafter called "BD"), which can record a huge amount of information to practical use.

An optical pickup device is used in reading information from such an optical recording medium or writing information thereon. Depending on the type of the optical recording medium, it is necessary to change the numerical aperture (NA) of an objective lens used in an optical pickup device and the wavelength of a light source used therein. For example, an objective lens whose NA is 0.45 and a light source whose wavelength is 780 nm are used for a CD, an objective lens whose NA is 0.60 and a light source whose wavelength is 650 nm are used for a DVD, and an objective lens whose NA is 0.85 and a light source whose wavelength is 405 nm are used for a BD.

Because the NA of an objective lens in use and the wavelength of a light source in use vary depending on the type of an optical recording medium, different optical pickup devices may be used for different optical recording mediums. It is however preferable that a single optical pickup device can compatibly use plural types of optical recording mediums, and multiple optical pickup devices of such a type have been developed. Some of such optical pickup devices have a plurality of objective lenses which can be switched from one to another depending on the type of an optical recording medium in use.

An objective lens included in an optical pickup device is generally mounted on a lens holder provided in an objective lens actuator, so that the focus direction and tracking direction can be adjusted. The same is true of the optical pickup device that has a plurality of objective lenses, which however should be mounted on the lens holder in such a way that the objective lenses do not tilt with respect to one another (i.e., the center axes of the objective lenses become in parallel).

The tilt angle of an objective lens actuator having a plurality of objective lenses is normally adjusted using a dominant one of the objective lenses for the optical pickup device so that the influence of comatic aberration or the like is reduced. At the time of, for example, adhering the objective lenses to the lens holder, however, the adhesion angle may be deviated, causing the objective lenses to tilt in relative to one another (relative tilt). In this case, when an objective lens which has not been used in adjusting the tilt angle of the objective lens actuator is used, comatic aberration occurs, bringing about a problem of degrading the quality of information read by the optical pickup device.

In an objective lens actuator having a plurality of objective lenses, therefore, a relative tilt caused between the objective lenses needs to be suppressed. There is a conventional proposal on such a technique. For example, JP-A-2005-174485 discloses a technique of designing objective lenses of an objective lens actuator in such a way as to be able to adjust the swing of the objective lenses about the principal point of the objective lenses and configuring an objective lens holding cylinder which can secure an objective lens by an adhesive or the like in such a way as to be able to adjust the swing of the objective lens holding cylinder about the principal point of the objective lenses. This configuration can reduce a relative tilt between the objective lenses.

However, the configuration disclosed in JP-A-2005-174485 requires special processing on the objective lenses to reduce a relative tilt, thereby undesirably increasing the cost of preparing the objective lenses. Because the objective lenses are configured to move along a spherical surface or the like in case of adjusting the tilt angle of each objective lens to reduce the relative tilt between the objective lenses, it is not quite easy to smoothly move the objective lenses, which makes the adjustment work harder.

As a solution to this problem, as shown in FIG. 7A and FIG. 7B, an objective lens 100 to be mounted on a lens holder 101 is configured to be mounted on a tilt adjusting holder 102 which has a structure to facilitate tilt adjustment, thereby ensuring low-cost adjustment of a relative tilt with better workability. This configuration however has the following problem. FIGS. 7A and 7B are diagrams for explaining the configuration of a conventional objective lens actuator; FIG. 7A is a diagram showing the cross sections of a part of the lens holder 101 of the objective lens actuator, and the tilt adjusting holder 102 on which the objective lens 100 is mounted, and FIG. 7B is an enlarged view of a portion encircled by a dotted line in FIG. 7A.

When adjustment of a relative tilt which is executed by moving the tilt adjusting holder 102 is completed, the tilt adjusting holder 102 is securely adhered to the lens holder 101. In consideration of the workability or the like, normally, the tilt adjusting holder 102 is moved after a UV adhesive which is cured by UV irradiation is applied to a corresponding portion of the tilt adjusting holder 102 or the lens holder 101 (for example, a filled-in-black portion 103 in FIG. 7B), not that an adhesive is supplied after the state of securing the tilt adjusting holder 102 is determined. Then, when adjustment of the relative tilt is completed, UV irradiation is performed to cure the adhesive, thereby securing the tilt adjusting holder 102.

In this case, the adhesive is likely to run around to other locations than an adhesion portion 103 at the time of adjusting the relative tilt. An adhesive 104 running around from the adhesion portion 103 has a certain thickness. When the temperature around the objective lens actuator changes, for example, the tilt adjusting holder 102 or the like is shifted from the set position due to the influence of thermal expansion or the like. In this case, the relative tilt between the objective lenses increases, thus reducing the reliability of the objective lens actuator.

SUMMARY OF THE INVENTION

Accordingly, it is an object of the present invention to provide a high-reliability objective lens actuator with a plurality of objective lenses, which can suppress a change in relative tilt between the objective lenses caused by adhesive fixation. It is another object of the present invention to provide an optical pickup device which has such an objective lens actuator to be able to reduce comatic aberration caused by a relative tilt between the objective lenses.

To achieve the object, an objective lens actuator according to the present invention comprises a plurality of objective lenses; a first lens holder on which the plurality of objective lenses are mounted; a second lens holder having a slide part and a projection formed thereon, the slide part sliding the second lens holder with respect to the first lens holder at a time of assembly, the projection being arranged outward of the slide part and protruding toward the first lens holder with the second lens holder being mounted on the first lens holder; and a drive mechanism that drives the first lens holder, wherein at least one of the plurality of objective lenses is mounted on the first lens holder while being held by the second lens holder, and the first lens holder has a groove formed therein where the projection is securely adhered.

Accordingly, a relative tilt between the plurality of objective lenses of the objective lens actuator can be adjusted by using the second lens holder at the time of assembly. The objective lens actuator is configured in such a way that the first lens holder and the second lens holder are adhered by using the projection provided at the second lens holder separately from the slide part and the groove formed in the first lens holder, not by the slide part as achieved in the conventional art. This prevents the adhesive to adhere the second lens holder to the first lens holder from running around to other portions than the adhesion portion. It is therefore possible to provide a high-reliability objective lens actuator which can suppress a change in relative tilt between the objective lenses caused by adhesive fixation.

It is preferable that in the objective lens actuator with the configuration, the projection should be formed in an approximately symmetrical shape with respect to a center axis of the objective lens held by the second lens holder.

Because the projection which is used at the time of adhering the second lens holder to the first lens holder is formed in an approximately symmetrical shape with respect to the center axis of the objective lens held by the second lens holder, the second lens holder can be adhered, well balanced, to the first lens holder.

It is preferable that in the objective lens actuator with the configuration, a first adhesion portion for adhering the second lens holder and the objective lens held by the second lens holder together should not overlie a second adhesion portion for adhering the first lens holder and the second lens holder together as seen from a side where the objective lens is arranged.

Accordingly, in a case where the first lens holder and the second lens holder are adhered together by using a UV adhesive which is cured by UV (ultraviolet radiation) irradiation, the amount of transmission of the UV is less likely to be reduced by the adhesion portion at which the second lens holder is adhered to the objective lens which is to be held by the second lens holder. This makes it possible to reliably adhere the first lens holder and the second lens holder together.

In the objective lens actuator with the configuration, the plurality of objective lenses may be two in number, and the at least one objective lens held by the second lens holder may be one in number.

With this configuration, the number of objective lenses to be mounted on the objective lens actuator is not too large, so that the objective lens actuator can be realized easily. The configuration moves only one of the objective lenses at the time of adjusting a relative tilt between the objective lenses and is easy to achieve.

An optical pickup device according to the present invention has an objective lens actuator with the foregoing configuration.

Because the optical pickup device has an objective lens actuator with the foregoing configuration, it is possible to reduce comatic aberration caused by a relative tilt between the objective lenses, thus ensuring high-quality reproduction and recording.

DETAILED DESCRIPTION OF THE PREFERRED EMBODIMENTS

A preferred embodiment of the present invention will be described below with reference to the accompanying drawings. The embodiment is just one illustrative example and is not restrictive.

Figure 1:
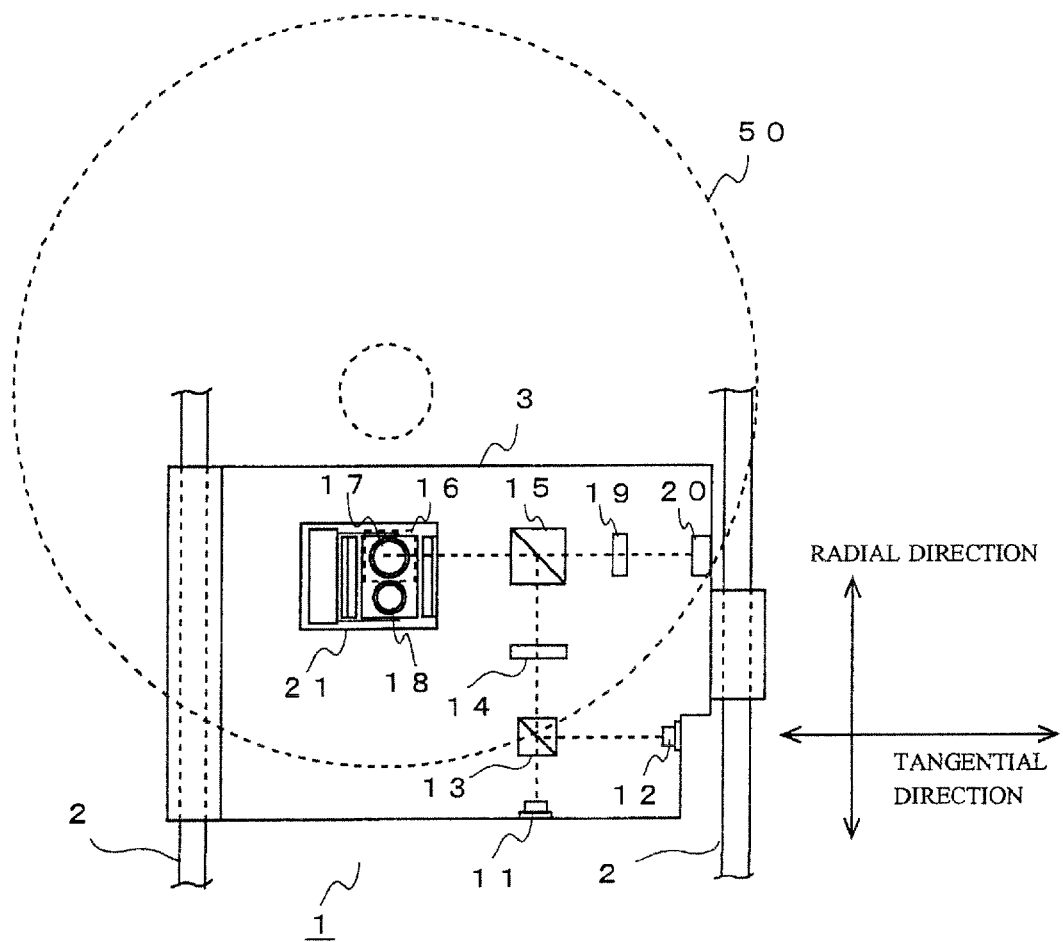
FIG. 1 is a schematic plan view showing the configuration of one embodiment of an optical pickup device having an objective lens actuator according to the present invention.

To begin with, the configuration of one embodiment of an optical pickup device 1 which has an objective lens actuator according to the present invention. FIG. 1 is a schematic plan view showing the configuration of the optical pickup device 1 of the embodiment. FIG. 1 shows those portions of the optical system of the optical pickup device 1 which are generally covered and not seen for easier explanation of the optical system.

The optical pickup device 1 of the embodiment is provided in such a way as to enable irradiation of a laser beam to three kinds (CD, DVD and BD) of optical discs (optical recording mediums) 50 to write and read information. The optical pickup device 1 is slidably supported on two guide rails 2 disposed in an optical disc unit having the optical pickup device 1. As the two guide rails 2 are disposed in parallel to the direction of the radius (radial direction) of the optical disc 50, the optical pickup device 1 can be moved in the radial direction.

As shown in FIG. 1, the optical system of the optical pickup device 1 includes a first light source 11, a second light source 12, a dichroic prism 13, a collimator lens 14, a beam splitter 15, a rising mirror 16, a first objective lens 17, and a second objective lens 18. Other optical members, such as a wavefront aberration correcting element which corrects a wavefront aberration, are adequately disposed as needed.

The first light source 11 is a single-wavelength laser diode that emits a laser beam with a wavelength of 405 nm which is used for BD. The second light source 12 is a two-wavelength laser diode that enables to switch laser beams of two kinds of wavelength and emits a laser beam with a wavelength of 650 nm which is used for DVD and a laser beam with a wavelength of 780 nm which is used for CD. The laser beams emitted from the first light source 11 and the second light source 12 are sent to the dichroic prism 13.

The dichroic prism 13 passes the laser beam emitted from the first light source 11, and reflects the laser beam emitted from the second light source 12. The laser beam which has passed the dichroic prism 13 is sent to the collimator lens 14 to be converted to a parallel light. The beam splitter 15 reflects the laser beams emitted from the first light source 11 and the second light source 12 to guide the laser beam toward the optical disc 50, and passes and guides reflected light from the recording surface (not shown) of the optical disc 50 toward a photodetector 20.

The laser beam emitted from the first light source 11 or the second light source 12 and reflected by the beam splitter 15 is reflected by the rising mirror 16 to travel in a direction perpendicular to the disc surface of the optical disc 50 (direction perpendicular to the surface of the sheet of FIG. 1). The laser beam reflected by the rising mirror 16 is sent to the first objective lens 17 or the second objective lens 18.

The first objective lens 17 and the second objective lens 18 both have a capability of condensing an input laser beam to the recording surface of the optical disc 50, and are both mounted on an objective lens actuator 21 which will be described in detail later. The first objective lens 17 is designed as an objective lens for BD, while the second objective lens 18 is designed as an objective lens for DVD and CD. The arrangement of the first objective lens 17 or the second objective lens 18 in the optical path is selectively switched according to the type of the optical disc 50 in use.

In the embodiment, the switching between the first objective lens 17 and the second objective lens 18 is carried out by moving the objective lens actuator 21 in the radial direction with respect to an optical pickup base 3 by moving means (not shown). It is to be noted however that the configuration to selectively use the two objective lenses 17, 18 is not restrictive, and the selective switching may be achieved by, for example, the configuration of an optical system.

The reflected light reflected at the recording surface of the optical disc 50 passes through the first objective lens 17 or the second objective lens 18, is reflected by the rising mirror 16, and passes through the beam splitter 15. The reflected light having passed the beam splitter 15 is condensed by a condenser lens 19 to be focused onto a light receiving area (not shown) of the photodetector 20.

The photodetector 20 serves to convert an optical signal received at the unillustrated light receiving area to an electric signal. The electric signal from the photodetector 20 is processed to become a reproduction signal for reproducing information, a focus error signal or a tracking error signal for focus adjustment or tracking adjustment of the objective lenses 17, 18, or the like.

Figure 2:
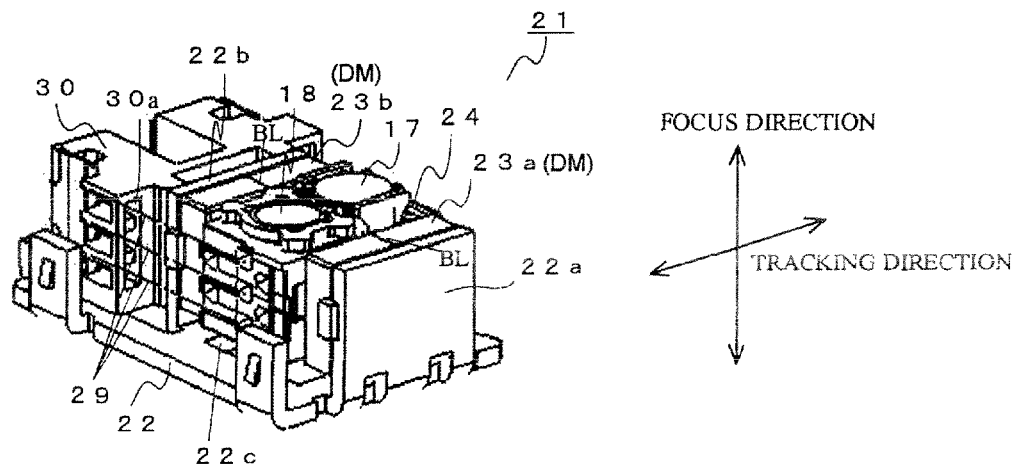
FIG. 2 is a schematic perspective view showing the configuration of the objective lens actuator according to the embodiment.
Figure 3A:
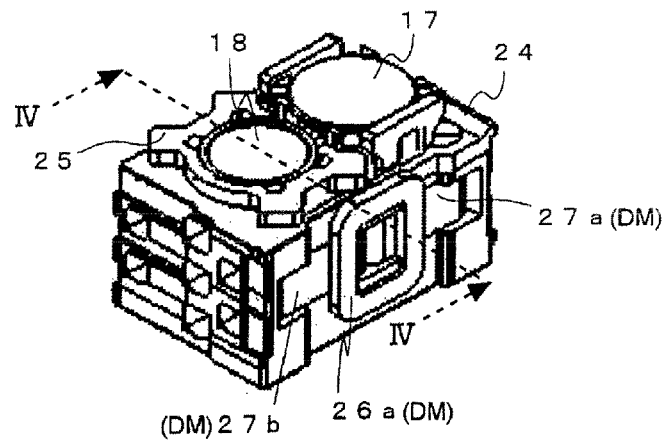
FIG. 3A is a schematic perspective view showing the configuration of a lens holder provided in the objective lens actuator of the embodiment.
Figure 3B:
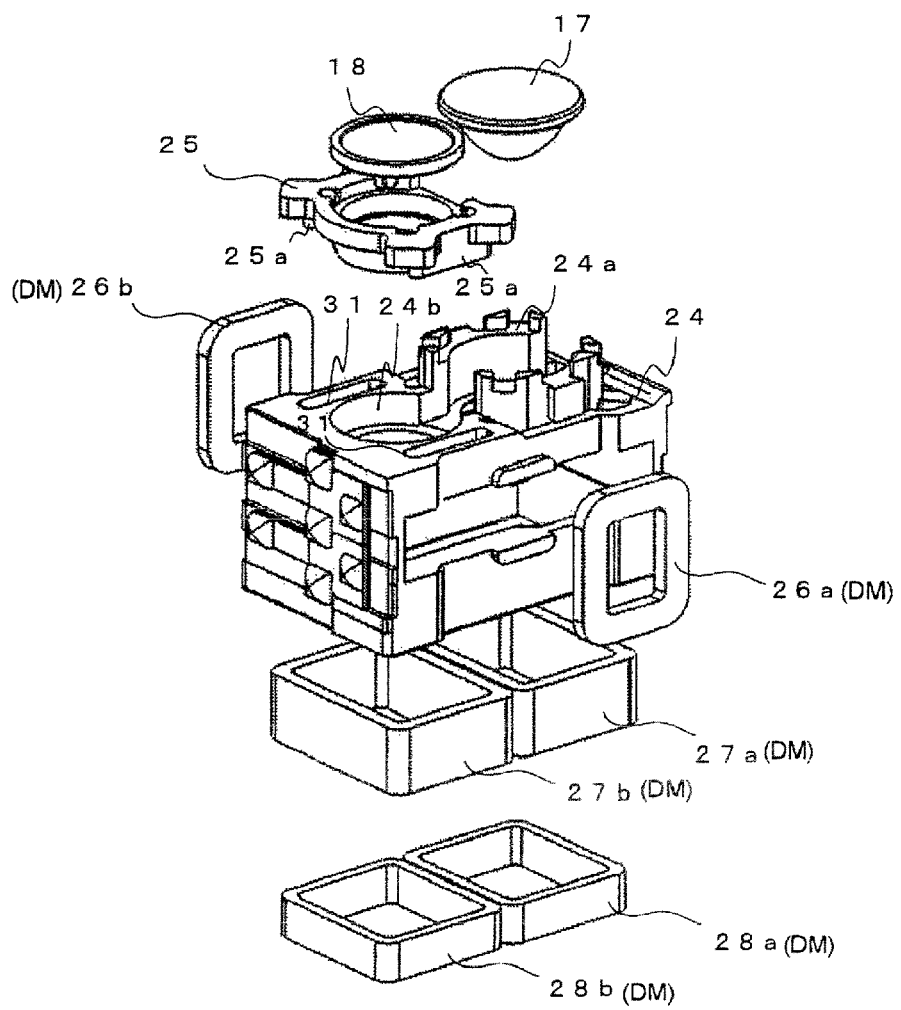
FIG. 3B is an exploded perspective view of the lens holder shown in FIG. 3A.

Next, the general configuration of the objective lens actuator 21 of the embodiment will be described referring to FIGS. 2, 3A and 3B. FIG. 2 is a schematic perspective view showing the configuration of the objective lens actuator 21 of the embodiment. FIGS. 3A and 3B are diagrams for explaining the configuration of a lens holder 24 provided in the objective lens actuator 21 of the embodiment; FIG. 3A is a schematic perspective view showing the configuration of the lens holder 24, and FIG. 3B is an exploded perspective view showing the configuration of the lens holder 24.

The objective lens actuator 21 mainly includes a base 22, permanent magnets 23a, 23b, the lens holder 24 and wires 29.

The base 22 is made of a ferromagnetic metal, and has a through hole 22c formed approximately in the center to transmit a laser beam. The lens holder 24 to be described later in detail is disposed above the through hole 22c. A pair of permanent magnets 23a, 23b facing each other with a predetermined gap therebetween to hold the lens holder 24 are provided upright on the base 22.

Each of the permanent magnets 23a, 23b has magnetic poles configured opposite to each other at a parting line BL as the boundary. The permanent magnet 23a and the permanent magnet 23b are arranged so that the same magnetic poles face each other. For example, N poles face each other in front of the parting line BL in FIG. 2, and S poles face each other on the depth side to the parting line BL. At the outer surfaces of the permanent magnets 23a, 23b projection pieces 22a, 22b formed bent from the base 22 are attracted.

Two hold parts 24a, 24b are formed at the lens holder (first lens holder) 24 to be able to hold the first objective lens 17 and the second objective lens 18. The first objective lens 17 is directly bonded to the first hold part 24a by an adhesive to be held there. The second objective lens 18 is bonded and held by an adhesive to a tilt adjusting holder (second lens holder) 25 which is in turn bonded to the second hold part 24b by an adhesive to be held on the lens holder 24.

The reason for mounting the second objective lens 18 on the lens holder 24 while being held on the tilt adjusting holder 25 is to ensure adjustment of a relative tilt between the first objective lens 17 and the second objective lens 18 without burden of cost and work at the time of assembling the objective lens actuator 21. The details on the relationship between the lens holder 24 and the tilt adjusting holder 25 will be given later.

Although the embodiment is configured so that the second objective lens 18 alone is mounted on the tilt adjusting holder 25, it may be configured so that the first objective lens 17 is also mounted on the tilt adjusting holder 25. If tilting of just one of the objective lenses can be adjusted, a relative tilt between the objective lenses 17, 18 can be adjusted, so that it is sufficient that one of the objective lenses is held on the tilt adjusting holder 25.

Tracking coils 26a, 26b are provided to face each other outside two of the side walls of the lens holder 24 which face the permanent magnets 23a, 23b. The tracking coils 26a, 26b are connected to generally be a single wire.

A focus coil 27a and a focus coil 27b are provided side by side with the same height, inward of the lens holder 24 in such a way that the focus coil 27a surrounds the optical axis of the first objective lens 17 and the focus coil 27b surrounds the optical axis of the second objective lens 18. The focus coils 27a, 27b are connected to generally be a single wire.

A tilt coil 28a and a tilt coil 28b are provided side by side with the same height, inward of the lens holder 24 and under the focus coils 27a, 27b in such a way that the tilt coil 28a surrounds the optical axis of the first objective lens 17 and the tilt coil 28b surrounds the optical axis of the second objective lens 18. The tilt coils 28a, 28b are connected to generally be a single wire.

The thus configured lens holder 24 is slidably supported by a plurality of conductive wires 29 (three wires provided on each of the right and left sides) having one ends fixed to respective right and left side walls of the lens holder 24 (side walls where the tracking coils 26a, 26b are not provided). The other ends of the wires 29 are inserted in gel holes 30a of a gel holder 30 formed on the base 22, and are soldered to a printed circuit board (not shown) provided adjacent to the gel holder 30.

With a gel material filled in the gel holes 30a, the gel holder 30 serves to attenuate and suppress vibration occurring on each wire 29 by means of the gel material as the lens holder 24 is driven.

The end portions of the individual conductive wires 29 that lie on the lens holder 24 side are arranged in such a way that the top two wires 29 are electrically connected to the tracking coils 26a, 26b by soldering, the middle two wires 29 are electrically connected to the focus coils 27a, 27b by soldering, and the bottom two wires 29 are electrically connected to the tilt coils 28a, 28b by soldering.

Accordingly, as a current is supplied to the tracking coils 26a, 26b from the circuit board via the wires 29 based on a signal generated from the tracking error signal, the lens holder 24 is displaced in the tracking direction (same as the radial direction) by the electromagnetic action of the magnetic field generated by the permanent magnets 23a, 23b and the current flowing through the tracking coil 26a, 26b.

Likewise, as a current is supplied to the focus coils 27a, 27b from the circuit board via the wires 29 based on a signal generated from the focus error signal, the lens holder 24 is displaced in the focus direction by the electromagnetic action. As a current is supplied to the tilt coils 28a, 28b from the circuit board via the wires 29 based on a signal generated by a tilt sensor (not shown) provided in the optical pickup device 1, the lens holder 24 is turned in a direction about the axis which is orthogonal to the focus direction and the tracking direction by the electromagnetic action.

That is, the permanent magnets 23a, 23b, the tracking coils 26a, 26b, the focus coils 27a, 27b, and the tilt coils 28a, 28b serve as a drive mechanism DM which drives the lens holder 24.

The features of the objective lens actuator 21 of the embodiment whose general configuration has been described above will be explained next. The objective lens actuator 21 has two objective lenses 17, 18 in which case a relative tilt between the objective lenses 17, 18 needs to be reduced as much as possible. In this respect, the objective lens actuator 21 of the embodiment is configured in such a way that as mentioned above, a relative tilt between the objective lenses 17, 18 can be adjusted by securely adhering the second objective lens 18 to the tilt adjusting holder 25 and adjusting the tilt of the tilt adjusting holder 25 with respect to the lens holder 24.

Figure 4:
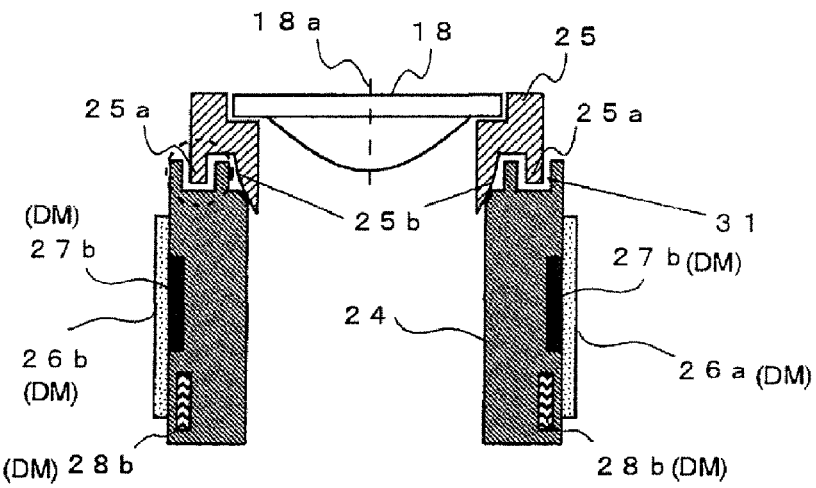
FIG. 4 is a schematic cross-sectional view along line IV-IV in FIG. 3A.
Figure 5:
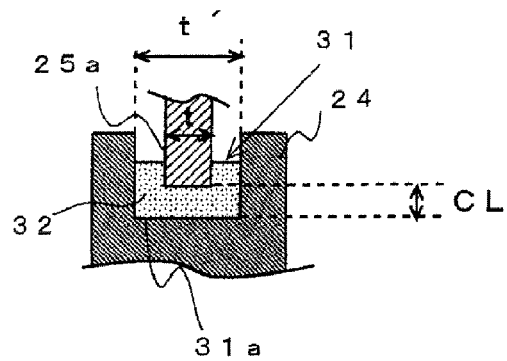
FIG. 5 is an enlarged view of a portion encircled by a dotted line in FIG. 4.

As mentioned above, conventionally, the adhesive runs around at the time of adjusting a relative tilt by the tilt adjusting holder 25, thereby deviating the relative tilt that has been adjusted after adhesive fixation. The objective lens actuator 21 of the embodiment is therefore configured so as to be able to prevent the adhesive from running around. This configuration will be described referring to FIGS. 4 and 5. FIG. 4 is a schematic cross-sectional view along line IV-IV in FIG. 3A. FIG. 5 is an enlarged view of a portion encircled by a dotted line in FIG. 4.

As shown in FIG. 4, a slide part 25b is provided at that portion of the lower side of the tilt adjusting holder 25 which contacts the lens holder 24. The slide part 25b serves to ensure smooth tilt adjustment on the tilt adjusting holder 25 with respect to the lens holder 24, and is provided to have, for example, a curved surface. As the tilt adjusting holder 25 is slid with respect to the lens holder 24 by the slide part 25b, a relative tilt is adjusted.

Projections 25a having an approximately rectangular cross section, which protrude toward the light incident side (corresponding to the lower side in FIG. 4) (which protrude toward the lens holder 24 with the tilt adjusting holder 25 mounted on the lens holder 24), are arranged outward of the slide part 25b and are formed at positions approximately symmetrical to each other with respect to a center axis 18a of the second objective lens 18 in the tilt adjusting holder 25. The projections 25a extend in a direction perpendicular to the surface of the sheet of FIG. 4 by a predetermined length (see FIG. 3B).

Grooves 31 (see FIG. 3B) are formed in the upper side of the lens holder 24. The grooves 31 are formed in such a way that the projections 25a of the tilt adjusting holder 25 are inserted in the grooves 31. Note that the projection 25a and the groove 31 have a relationship as shown in FIG. 5.

Specifically, the relationship between a width t of the projection 25a and a width t' of the groove 31 becomes t<t', and a predetermined clearance CL is provided between the projection 25a and a bottom surface 31a of the groove 31. Designing the relationship between the projection 25a and the groove 31 this way inhibits the projection 25a and the groove 31 from coming in contact with each other, which would otherwise interfere with the sliding of the tilt adjusting holder 25, at the time the tilt adjusting holder 25 is slid with respect to the lens holder 24.

A description will now be given of the action of the objective lens actuator 21 of the embodiment with the foregoing configuration while explaining procedures of adjusting a relative tilt between the first objective lens 17 and the second objective lens 18.

At the time of adjusting a relative tilt between the objective lenses, the first objective lens 17 is securely adhered to the first hold part 24a of the lens holder 24 and is not moved as mentioned above. The second objective lens 18 is securely adhered to the tilt adjusting holder 25, so that its tilt is adjusted by moving the tilt adjusting holder 25. Before the adjustment of the relative tilt by the tilt adjusting holder 25, a UV adhesive (adhesive to be cured by UV irradiation) is injected in the grooves 31 of the lens holder 24 by a predetermined amount and the tilt adjusting holder 25 is arranged at the second hold part 24b (see FIG. 3B) of the lens holder 24.

In this state, the relative tilt is adjusted while moving the tilt adjusting holder 25. The adjustment of a relative tilt between the objective lenses 17, 18 is carried out by a method of acquiring values on the tilts of the reflected lights at the rounded edges of the objective lenses 17, 18 by using, for example, a publicly-known laser auto collimator which measures the tilt of a measuring target in a non-contact manner, and determining that the tilts are the same when the values match with each other.

When the adjustment of a relative tilt between the objective lenses 17, 18 is completed, UV is irradiated toward the grooves 31 from the top surface side, curing the UV adhesive 32 so that the tilt adjusting holder 25 is secured to the lens holder 24. The tilt adjusting holder 25 is formed of a material having a high UV transmissivity (e.g., polycarbonate or acrylic material).

As described above, the adhesive to adhere the lens holder 24 and the tilt adjusting holder 25 together is filled in the grooves 31, so that the adhesive is unlike to run around to other portions than the adhesion portion. The adhesive layer can be made as thin as possible by adequately adjusting the widths of the projection 25a and the groove 31 and the clearance CL between the projection 25a and the groove 31 to set the amount of the adhesive 32 to be filled in the groove 31 to an adequate amount. Making the adhesive layer thin can reduce the amount of displacement of the set position of the tilt adjusting holder 25 caused by the influence of the temperature environment or the like. Further, the adhesion area can be increased depending on the design of the structure of the projection 25a and the groove 31. Therefore, the objective lens actuator 21 of the embodiment can make a relative tilt between the objective lenses 17, 18 as small as possible.

Figure 6:
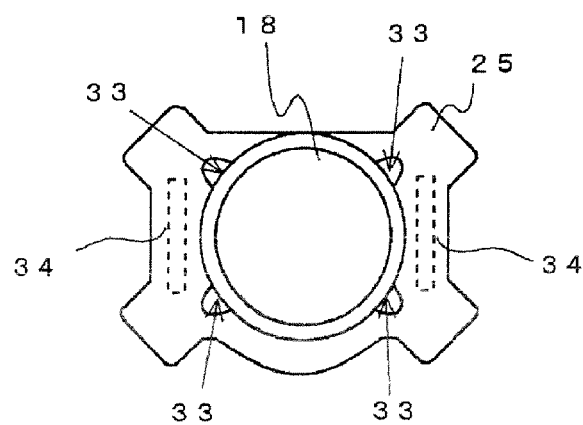
FIG. 6 is a schematic plan view of a tilt adjusting holder provided in the objective lens actuator of the embodiment as seen from above.
Figure 7A:
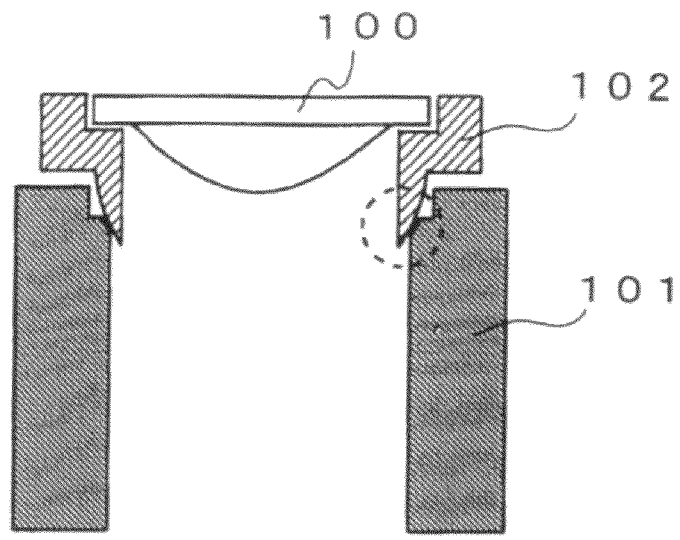
FIG. 7A is a diagram for explaining the configuration of the conventional objective lens actuator and shows the cross sections of a part of the lens holder of the objective lens actuator, and the tilt adjusting holder on which an objective lens is mounted.
Figure 7B:
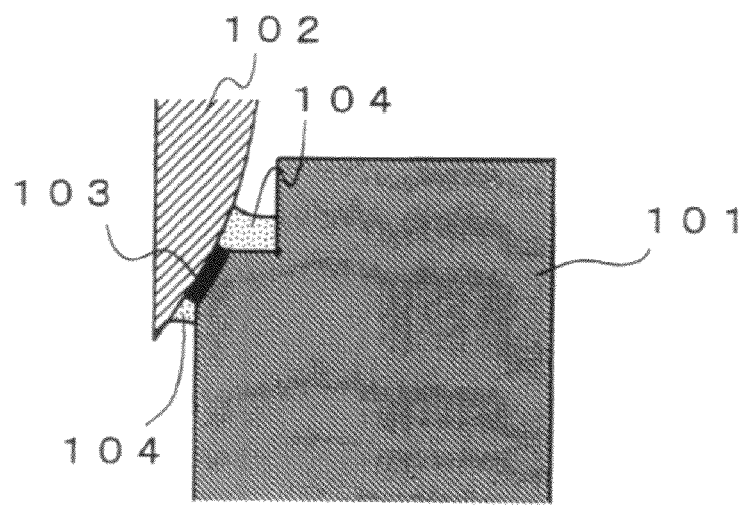
FIG. 7B is an enlarged view for explaining the configuration of the conventional objective lens actuator and shows a portion encircled by a dotted line in FIG. 7A.

In the objective lens actuator 21, as shown in FIG. 6, a first adhesion portion 33 for adhering the second objective lens 18 and the tilt adjusting holder 25 together is structured so as not to overlie a second adhesion portion 34 (approximately corresponding to a position where the projection 25a of the tilt adjusting holder 25 which is adhered to the groove 31 of the lens holder 24 is provided) for adhering the tilt adjusting holder 25 and the lens holder 24 as seen from above. FIG. 6 is a schematic plan view of the tilt adjusting holder 25 as seen from above. FIG. 6 also shows the second objective lens 18.

With this configuration, when the lens holder 24 and the tilt adjusting holder 25 are securely adhered by UV irradiation, the UV transmissivity does not become lower even with the presence of the first adhesion portion 33, thus preventing insufficient adhesion between the lens holder 24 and the tilt adjusting holder 25.

Although the above-described embodiment is configured so that the grooves 31 of the lens holder 24 and the projections 25a of the tilt adjusting holder 25 are each provided two in number at approximately symmetrical positions with the center axis 18a of the second objective lens 18 in between, the configuration is not restrictive and can be modified in various forms without departing from the spirit and scope of the present invention. For example, the configuration may be modified so that the projections 25a and the grooves 31 are so provided as to surround the second objective lens 18.

In the above-described embodiment, the objective lens actuator is of a wire supporting type which is supported by wires. However, the present invention can be adapted to a variety of objective lens actuators which have a plurality of objective lenses and perform adjustment of a relative tilt between the objective lenses. For example, the objective lens actuator may be modified to be of an axial slide type, and the locations and the number of objective lenses to be mounted on the objective lens actuator are not limited to those of the embodiment.

Although the optical pickup device having the objective lens actuator of the embodiment of the present invention is configured to be able to read and write information from and into a BD, DVD and CD, the configuration is not restrictive and the invention can be adapted to a variety of optical pickup devices which use a plurality of objective lenses.

According to the present invention, in the objective lens actuator having a plurality of objective lenses mounted thereon, a relative tilt between the objective lenses can be reduced as small as possible. Accordingly, the optical pickup device having the objective lens actuator of the invention mounted thereon can suppress occurrence of comatic aberration. Therefore, the invention is very useful.

What is claimed is:

1. An objective lens actuator comprising:
   a plurality of objective lenses;
   a first lens holder on which the plurality of objective lenses are mounted;
   a second lens holder having a slide part and a projection formed thereon, the slide part sliding the second lens holder with respect to the first lens holder for tilt adjustment at a time of assembly, the projection being arranged outward of the slide part and protruding toward the first lens holder with the second lens holder being mounted on the first lens holder; and
   a drive mechanism that drives the first lens holder,
   wherein at least one of the plurality of objective lenses is mounted on the first lens holder while being held by the second lens holder, and
   the first lens holder has a groove formed therein where the projection is securely adhered by a predetermined amount of adhesive injected in the groove.

2. The objective lens actuator according to claim 1, wherein the projection is formed in an approximately symmetrical shape with respect to a center axis of the objective lens held by the second lens holder.

3. The objective lens actuator according to claim 2, wherein a first adhesion portion for adhering the second lens holder and the objective lens held by the second lens holder together does not overlie a second adhesion portion for adhering the first lens holder and the second lens holder together as seen from a side where the objective lens is arranged.

4. The objective lens actuator according to claim 3, wherein the plurality of objective lenses are two in number, and the at least one objective lens held by the second lens holder is one in number.

5. An optical pickup device having an objective lens actuator as recited in claim 4.

6. An optical pickup device having an objective lens actuator as recited in claim 3.

7. The objective lens actuator according to claim 2, wherein the plurality of objective lenses are two in number, and the at least one objective lens held by the second lens holder is one in number.

8. An optical pickup device having an objective lens actuator as recited in claim 7.

9. An optical pickup device having an objective lens actuator as recited in claim 2.

10. The objective lens actuator according to claim 1, wherein a first adhesion portion for adhering the second lens holder and the objective lens held by the second lens holder together does not overlie a second adhesion portion for adhering the first lens holder and the second lens holder together as seen from a side where the objective lens is arranged.

11. The objective lens actuator according to claim 10, wherein the plurality of objective lenses are two in number, and the at least one objective lens held by the second lens holder is one in number.

12. An optical pickup device having an objective lens actuator as recited in claim 11.

13. An optical pickup device having an objective lens actuator as recited in claim 10.

14. The objective lens actuator according to claim 1, wherein the plurality of objective lenses are two in number, and the at least one objective lens held by the second lens holder is one in number.

15. An optical pickup device having an objective lens actuator as recited in claim 14.

16. An optical pickup device having an objective lens actuator as recited in claim 1.

* * * * *